(12) United States Patent
Sobotka et al.

(10) Patent No.: US 11,608,126 B2
(45) Date of Patent: Mar. 21, 2023

(54) EXPENDABLE WHEEL BASE CHASSIS

(71) Applicant: Xtreme Manufacturing, LLC, Henderson, NV (US)

(72) Inventors: Ryan Paul Sobotka, Eureka, MO (US); Jacob Wayne Adkins, Las Vegas, NV (US)

(73) Assignee: XTREME MANUFACTURING, LLC, Henderson, NV (US)

( * ) Notice: Subject to any disclaimer, the term of this patent is extended or adjusted under 35 U.S.C. 154(b) by 317 days.

(21) Appl. No.: 16/744,911

(22) Filed: Jan. 16, 2020

(65) Prior Publication Data
US 2021/0221450 A1   Jul. 22, 2021

(51) Int. Cl.
| | | |
|---|---|---|
| *B62D 49/06* | (2006.01) | |
| *B62D 7/06* | (2006.01) | |
| *B66F 9/065* | (2006.01) | |
| *B66F 9/075* | (2006.01) | |
| *B66F 11/04* | (2006.01) | |

(52) U.S. Cl.
CPC ............ *B62D 49/0678* (2013.01); *B62D 7/06* (2013.01); *B66F 9/0655* (2013.01); *B66F 9/07559* (2013.01); *B66F 11/046* (2013.01); *B60G 2300/40* (2013.01)

(58) Field of Classification Search
CPC ............... B66F 9/07559; B66F 9/0655; B60G 2300/40; B62D 7/06; B62D 49/0678; B60B 35/10; B60B 23/12
See application file for complete search history.

(56) References Cited

U.S. PATENT DOCUMENTS

| | | | | |
|---|---|---|---|---|
| 3,306,390 A | * | 2/1967 | Jamme | B62D 61/12 180/41 |
| 3,677,572 A | * | 7/1972 | Fontan | B62D 49/0607 414/459 |
| 3,820,497 A | | 6/1974 | Konijn | |

(Continued)

FOREIGN PATENT DOCUMENTS

| | | | | |
|---|---|---|---|---|
| CA | 3011992 A1 | * | 2/2019 | ......... B60B 35/1054 |
| CN | 106185747 A | * | 12/2016 | ............ B66F 11/042 |

(Continued)

OTHER PUBLICATIONS

Extended European Search Report, dated Jun. 17, 2021, for related EP patent application No. EP 20214156.0 (10 pgs.).

*Primary Examiner* — Paul N Dickson
*Assistant Examiner* — Maxwell L Meshaka
(74) *Attorney, Agent, or Firm* — Armstrong Teasdale LLP

(57) ABSTRACT

A support system for a vehicle includes a base and at least a first and a second support arm. Each of the first and the second support arms include a base end pivotally coupled to the base through a respective hinge assembly. Each of the first and the second support arms further include a distal end opposite the base end. The support system also includes a respective wheel assembly coupled to each distal end. Each wheel assembly includes an independently powered and steerable wheel configured to engage a travel surface, a propelling motor configured to drive a respective first support arm between a stowed condition and a deployed condition unaided while the vehicle remains stationary, and a steer actuator configured to change an angle of the wheel with respect to a respective support arm.

18 Claims, 9 Drawing Sheets

(56) References Cited

U.S. PATENT DOCUMENTS

| | | | |
|---|---|---|---|
| 3,899,037 A * | 8/1975 | Yuker | B60G 17/01925 |
| | | | 180/41 |
| 4,266,627 A | 5/1981 | Lauber | |
| 4,929,143 A | 5/1990 | Dohnalik | |
| 6,332,748 B1 | 12/2001 | Doering et al. | |
| 7,198,278 B2 | 4/2007 | Donaldson | |
| 7,832,741 B2 | 11/2010 | Donaldson | |
| 9,174,488 B2 | 11/2015 | Berry et al. | |
| 9,776,846 B2 | 10/2017 | Ditty | |
| 2005/0212253 A1 * | 9/2005 | Donaldson | B62D 49/08 |
| | | | 280/297 |
| 2007/0003395 A1 | 1/2007 | Segerljung | |
| 2008/0277890 A1 * | 11/2008 | Boster, II | B66F 9/07568 |
| | | | 187/222 |
| 2011/0042164 A1 | 2/2011 | Clark et al. | |
| 2013/0241161 A1 * | 9/2013 | Berry | B66F 9/07522 |
| | | | 280/5.52 |
| 2014/0327221 A1 * | 11/2014 | Berry | B66C 23/62 |
| | | | 280/124.128 |
| 2015/0259185 A1 | 9/2015 | Ditty | |
| 2015/0368867 A1 | 12/2015 | Berning et al. | |
| 2017/0203628 A1 * | 7/2017 | Dames | B60G 7/001 |
| 2017/0291802 A1 | 10/2017 | Hao et al. | |
| 2018/0333987 A1 * | 11/2018 | Ratcliffe | B60B 35/1036 |
| 2020/0163269 A1 * | 5/2020 | Crowley | B60B 35/109 |
| 2021/0316783 A1 * | 10/2021 | Lawson, Jr. | B62D 9/00 |

FOREIGN PATENT DOCUMENTS

| | | | | |
|---|---|---|---|---|
| CN | 106185747 A | | 12/2016 | |
| EP | 1632132 A2 | * | 3/2006 | A01G 23/083 |
| EP | 2374635 A1 | | 10/2011 | |
| EP | 2641860 A1 | | 9/2013 | |
| FR | 2844245 A1 | * | 3/2004 | B62D 21/14 |
| WO | WO-2006112732 A1 | * | 10/2006 | A61G 5/046 |
| WO | WO-2010145030 A1 | * | 12/2010 | B62D 13/025 |

* cited by examiner

EXPENDABLE WHEEL BASE CHASSIS

FIELD

The field of the disclosure relates generally to construction equipment, and more particularly self-propelled construction vehicles including a vehicle support system that is extendable.

BACKGROUND

At least some known construction machines are limited in the extension capabilities of their boom by the dimensions of the footprint of the construction machine, where the footprint is related to stabilizing members that touch the ground. The footprint can be established using the wheelbase and/or wheel track of a self-propelled vehicle or can be established using outriggers. Outriggers are typically used because they can be stowed when not in use, for example, during transport between work sites and can be deployed to increase the footprint of the construction machine at the work site. However, outriggers have problems that limit their usefulness in many situations. For example, many construction machines are expected to be mobile on a jobsite that is movable from one location to another location on the jobsite. However, outriggers take time to deploy.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION

In one aspect, a support system for a vehicle includes a base and at least a first and a second support arm. Each of the first and the second support arms include a base end pivotally coupled to the base through a respective hinge assembly. Each of the first and the second support arms further include a distal end opposite the base end. The support system also includes a respective wheel assembly coupled to each distal end. Each wheel assembly includes an independently powered and steerable wheel configured to engage a travel surface, a propelling motor configured to drive a respective first support arm between a stowed condition and a deployed condition unaided while the vehicle remains stationary, and a steer actuator configured to change an angle of the wheel with respect to a respective support arm.

In another aspect, an aerial work vehicle includes a self-propelled vehicle base, a telescoping boom pivotally coupled to an upper surface of the vehicle base, and a plurality of support arms pivotable outwardly from the base in a same plane as the base. Each of the plurality of support arms includes a hinge assembly coupled to a respective corner of the base. A portion of the base forms a portion of the hinge assembly. Each of the plurality of support arms also includes a first end of a support arm body coupled to and forming a portion of the hinge assembly and a wheel assembly coupled to a second end of the support arm body.

In yet another aspect, a method of operating a construction machine includes turning at least one wheel, independently from any other wheel, to a predetermined toe-out orientation, driving the at least one wheel using an associated wheel motor from a stowed condition of a respective support arm to a deployed condition of the respective support arm, locking the respective support arm in the deployed condition, and controlling steering of the at least one wheel in an operational mode of the construction machine.

DETAILED DESCRIPTION

Figure 1:
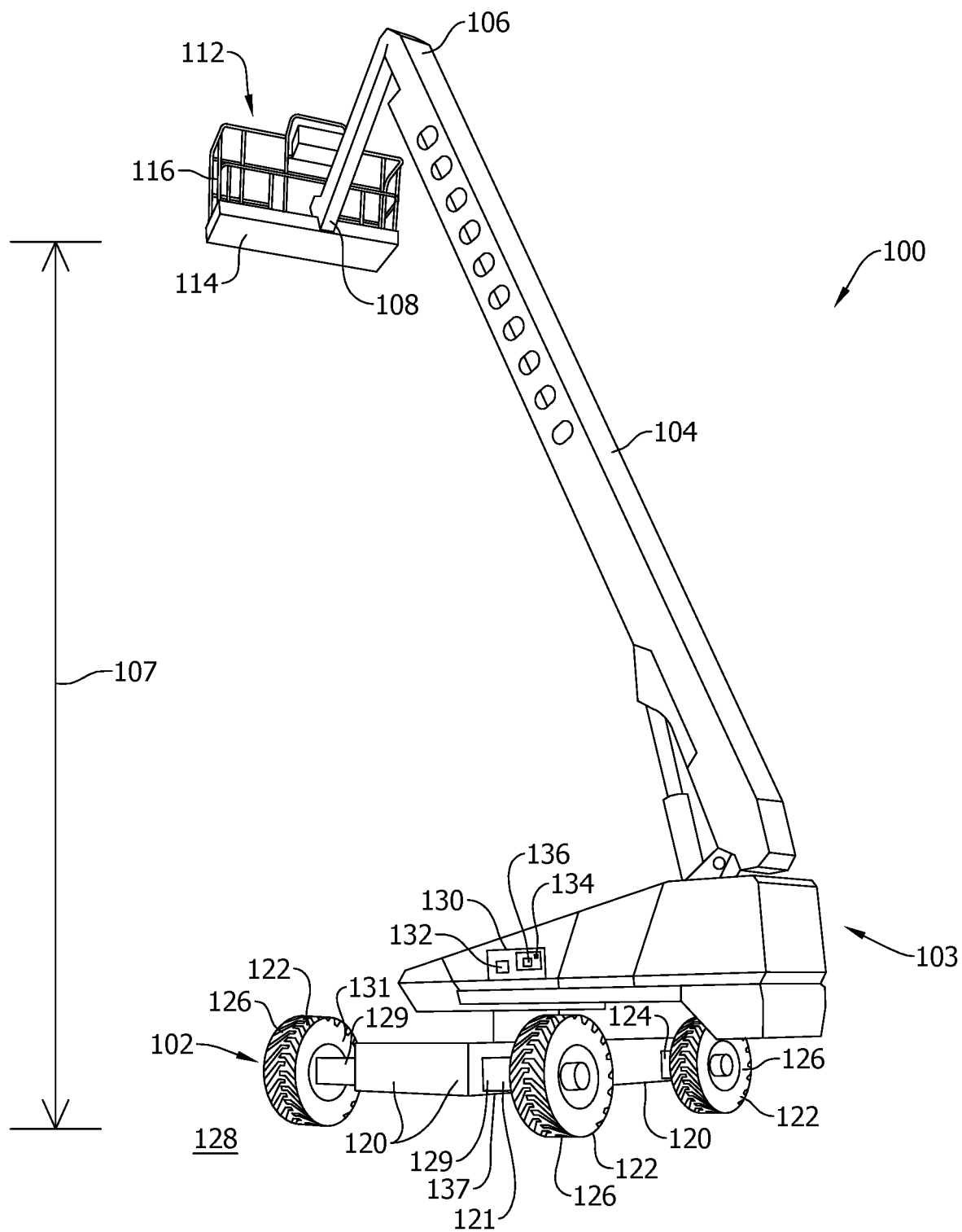
FIG. 1 is a perspective view of an extendable wheel-base lift vehicle that includes a vehicle portion to which, a boom assembly is mounted.

An extendable wheel-base lift vehicle that includes a vehicle portion to which, a boom assembly is mounted is described herein. Although described as an extendable wheel-base lift vehicle, the vehicle support system may be applied to other types of wheeled and tracked vehicles. In various embodiments, the boom assembly includes a plurality of telescoping booms. In some embodiments, the boom assembly can be raised to a height of zero meters to a height greater than 60.0 meters. In other embodiments, boom assembly can be raised to a height of zero meters to a height greater than 65.0 meters. A support member is mounted to the distal end of the uppermost boom. A work platform, including a deck and handrail is mounted to the support member. The vehicle portion includes a base and a plurality of support arms. In various embodiments, the base has a double-concave shape in a longitudinal direction. The double-concave or hour-glass shape includes two opposing straight sides and two opposing concave sides. Although described as having an hour-glass shape, the base can have any shape that permits the base to accomplish the features described herein. Each support arm includes a respective wheel assembly coupled to a distal end of the support arms. The wheel assembly includes a wheel configured to engage a travel surface.

The vehicle portion is configured to operate in a plurality of modes from a transport mode to an operational mode. In the transport mode, all support arms are fully retracted such that a distal end of each support arm touches or very nearly touches an adjacent support arm. The transport mode permits extendable wheel-base construction vehicle to fit on a flatbed trailer for transport between jobsites. In the operational mode, all support arms are fully extended and locked in position and the wheels are configured to be driven and steered by an operator providing input to a controller. In the example embodiment, the vehicle portion includes a support system for the construction vehicle that includes a base, at least first and second support arms. However, in most applications, four support arms are used. To a great extent, adjacent support arms are mirrors of each other and support arms that are caddy-corner with respect to each other are substantially identical.

Each of the support arms include a base end pivotally coupled to the base through a respective hinge assembly. The hinge assembly is also referred to as a four-bar arrangement. Each of the support arms includes a distal end opposite the base end. A respective wheel assembly is coupled to each distal end. Each wheel assembly includes an independently powered and steerable wheel configured to engage the travel surface. Hinge assembly includes a plurality of pivotable connection points including a base pivot positioned at an intersection of adjacent straight sides and concave sides, a king pin of base spaced apart from base pivot, a main pivot positioned at base end, and an intermediate pivot positioned between the base end and the distal end. Hinge assembly also includes a main support beam pivotally coupled between the king pin and the main pivot. A secondary link is pivotally coupled between the intermediate pivot and the base pivot. A portion of the base between the king pin and the base pivot also forms one bar of the four-bar arrangement, and a portion of the support arm between the main pivot and intermediate pivot forms the final bar.

A propelling motor is configured to drive a respective first support arm between a stowed condition, in, for example, a transport mode and a deployed condition in, for example, an operational mode unaided while the construction vehicle remains stationary. Respective propelling motors are configured to drive adjacent support arms away from each other and the distal end away from the base while the construction vehicle remains stationary. Unaided, as used herein, refers to there only being a single power source intended to translate support arms between the deployed condition (shown in FIG. 6) and the stowed condition of the construction vehicle. A steer actuator is configured to change an angle of the wheels with respect to the support arm.

Each wheel assembly is configured to drive one of first support arm and second support arm away from the other of first support arm and second support arm and configured to drive the distal end away from the base while the construction vehicle remains stationary without scuffing wheels across travel surface. In the example embodiment, the vehicle portion includes axes in a longitudinal direction and a lateral direction.

During operation of the construction machine a method includes turning at least one wheel, independently from any other wheel, to a predetermined toe-out orientation, driving the at least one wheel using an associated wheel motor from a stowed condition of a respective support arm to a deployed condition of the respective support arm, locking the respective support arm in the deployed condition, and controlling steering of the at least one wheel in an operational mode of the construction machine. Because the path of the wheels over the travel surface to extend or retract the support arms may not be a simple arc, a controller preprogrammed to control the steering of the wheels during extension and retraction. Also, because the travel surface at certain times at jobsites may be too slippery or otherwise not provide sufficient traction for one or more of the wheels, the hydraulic cylinder may be used to assist the wheels in driving the support arms to their extended or retracted positions. In some instances, either the wheels or the hydraulic cylinder may be the sole source of power to drive the support arms to their extended or retracted positions.

FIG. 1 is a perspective view of a construction vehicle 100, such as, a construction vehicle that includes a vehicle portion 102 to which, a boom assembly 103 is mounted. In various embodiments, boom assembly 103 includes a plurality of telescoping booms, for example, boom segments 104 and 106. Boom assembly 103 may have more or less boom segments than boom segments 104 and 106. In some embodiments, boom assembly 103 can be raised to a height 107 greater than 60.0 meters. In other embodiments, boom assembly 103 can be raised to height 107 greater than 65.0 meters. A support member 108 is mounted to the distal end 110 of upper boom 106. A work platform 112, including a deck 114 and handrail 116 is mounted to support member 108. Vehicle portion 102 includes a base 118 and a plurality of support arms 120. In various embodiments, base 118 embodies a double-concave shape in a longitudinal direction (shown in FIG. 2). The double-concave or hour-glass shape includes two opposing straight sides (shown in FIG. 2) and two opposing concave sides (also shown in FIG. 2). Each support arm 120 includes a respective wheel assembly 122 coupled to a distal end 124 of support arms 120. Wheel assembly 122 includes a wheel 126 configured to engage a travel surface 128. A steer actuator 129 is configured to change an angle of an associated wheel 126 with respect to support arm 120. A wheel angular position indicator 131 determines a relative angle of the wheels 126 with respect to support arm 120 associated with that wheel angular position indicator 131.

Various functions of construction vehicle 100 are performed by and/or assisted by a controller 130 that includes a processor 132 communicatively coupled to a memory device 134. Memory device 134 includes various data structures 136 for storing information for use by processor 132. One such data structure includes a look-up table.

Figure 2:
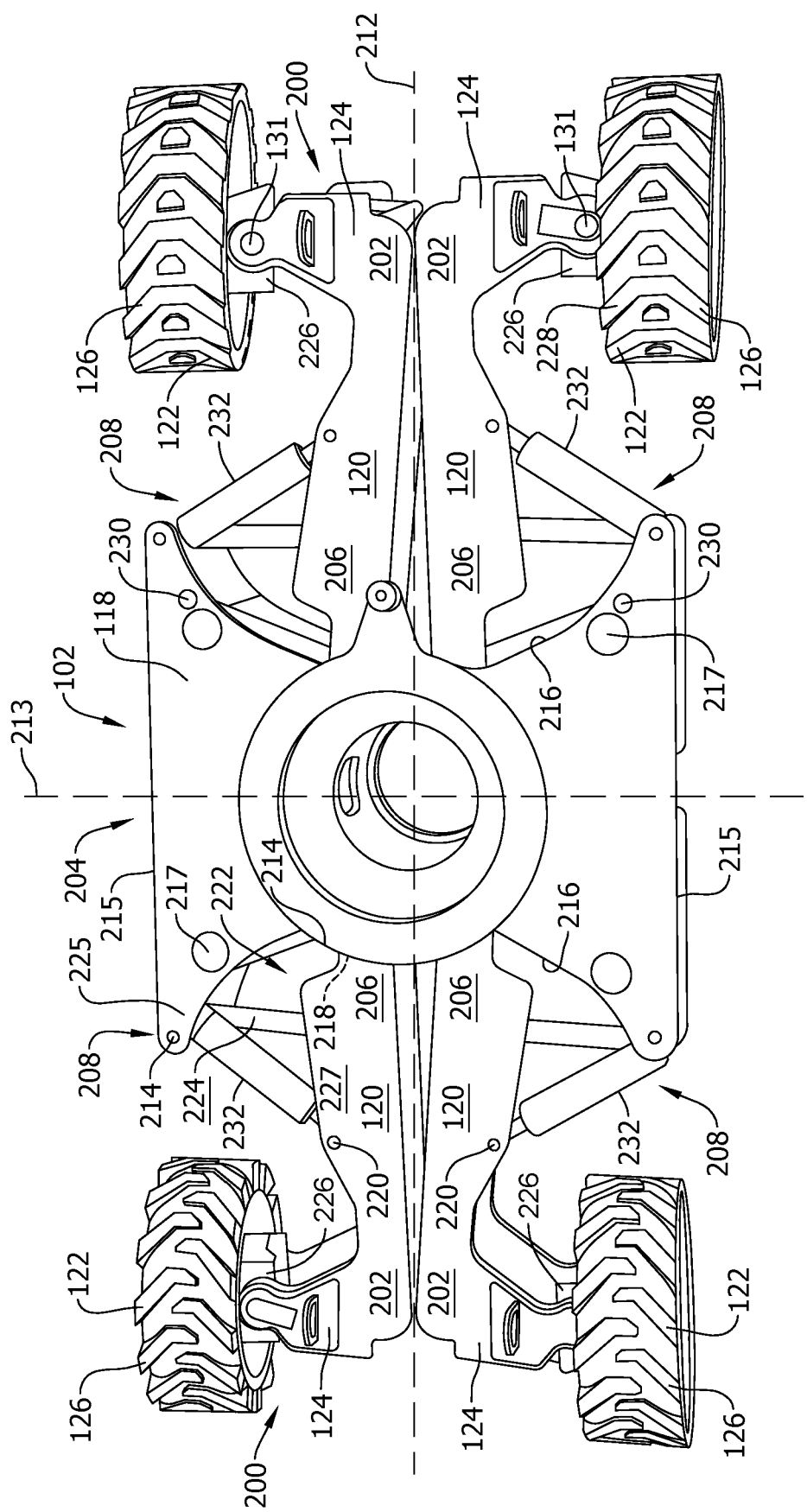
FIG. 2 is a plan view of an extendable vehicle support system of the construction vehicle shown in FIG. 1 in a transport mode.

FIG. 2 is a plan view of vehicle portion 102 in a transport mode 200. In transport mode 200, all support arms 120 are fully retracted such that a distal end 202 of each support arms 120 touches or very nearly touches an adjacent support arm 120. Transport mode 200 permits construction vehicle 100 to fit on a flatbed trailer for transport between jobsites. In the example embodiment, vehicle portion 102 includes a support system 204 for construction vehicle 100 that includes base 118, at least first and second support arms 120. However, in most applications, four support arms 120 are used. To a great extent, adjacent support arms 120 are mirrors of each other and support arms 120 that are caddy-corner with respect to each other are substantially identical.

Each of the support arms 120 include a base end 206 pivotally coupled to base 118 through a respective hinge assembly 208. Hinge assembly 208 is also referred to as a four-bar arrangement or an asymmetrical-parallelogram hinge assembly. Each of support arms 120 include distal end 202 opposite base end 206. A respective wheel assembly 122 is coupled to each distal end 202. Each wheel assembly 122 includes an independently powered and steerable wheel 126 configured to engage travel surface 128. Hinge assembly 208 includes a plurality of pivotable connection points including a base pivot 214 positioned at an intersection of adjacent straight sides 215 and concave sides 216, a king pin of base 118 spaced apart from base pivot 214, a main pivot 218 positioned at base end 206, and an intermediate pivot 220 positioned between base end 206 and distal end 202. Hinge assembly 208 also includes a main support beam 222 pivotally coupled between a king pin 217 and a main pivot 218, a secondary link 224 pivotally coupled between intermediate pivot 220 and base pivot 214, a portion 225 of base 118 between king pin 217 and base pivot 214, and a portion 227 of support arm 120 between main pivot 218 and intermediate pivot 220. A support arm angular position indicator 230 detects an angular position of king pin 217 as support arm 120 moves from the transport mode position to the operational mode position.

A propelling motor 226 is configured to drive a respective first support arm 120 between a stowed condition, in, for example, transport mode 200 and a deployed condition in, for example, operational mode 600 (shown in FIG. 6) unaided while construction vehicle 100 remains stationary. Respective propelling motors 226 are configured to drive adjacent support arms 120 away from each other of and distal end 202 away from base 118 while construction vehicle 100 remains stationary. Unaided, as used herein, refers to there only being a single power source intended to translate support arms 120 between the deployed condition (shown in FIG. 6) and stowed condition of construction vehicle 100. Steer actuator 129 is configured to change an angle 228 of wheel 126 with respect to support arm 120. Angle 228 is detected by wheel angular position indicator 131.

Each wheel assembly 122 is configured to drive one of first support arm 120 and second support arm 120 away from the other of first support arm 120 and second support arm 120 and configured to drive distal end 202 away from base 118 while construction vehicle 100 remains stationary without scuffing wheels 126 across travel surface 128. In the example embodiment, vehicle portion 102 includes axes in a longitudinal direction 212 and a lateral direction 213.

A double-acting hydraulic cylinder 232 is coupled between base 118 and support arm 120. Primarily, hydraulic cylinder 232 provides a lock on support arms 120 to prevent them from moving during operation or transport modes. Hydraulic cylinder 232 may also be used to assist the powered wheels 126 in driving support arms 120 or may be used exclusively for driving support arms 120 between their retracted and extended positions.

Figure 3:
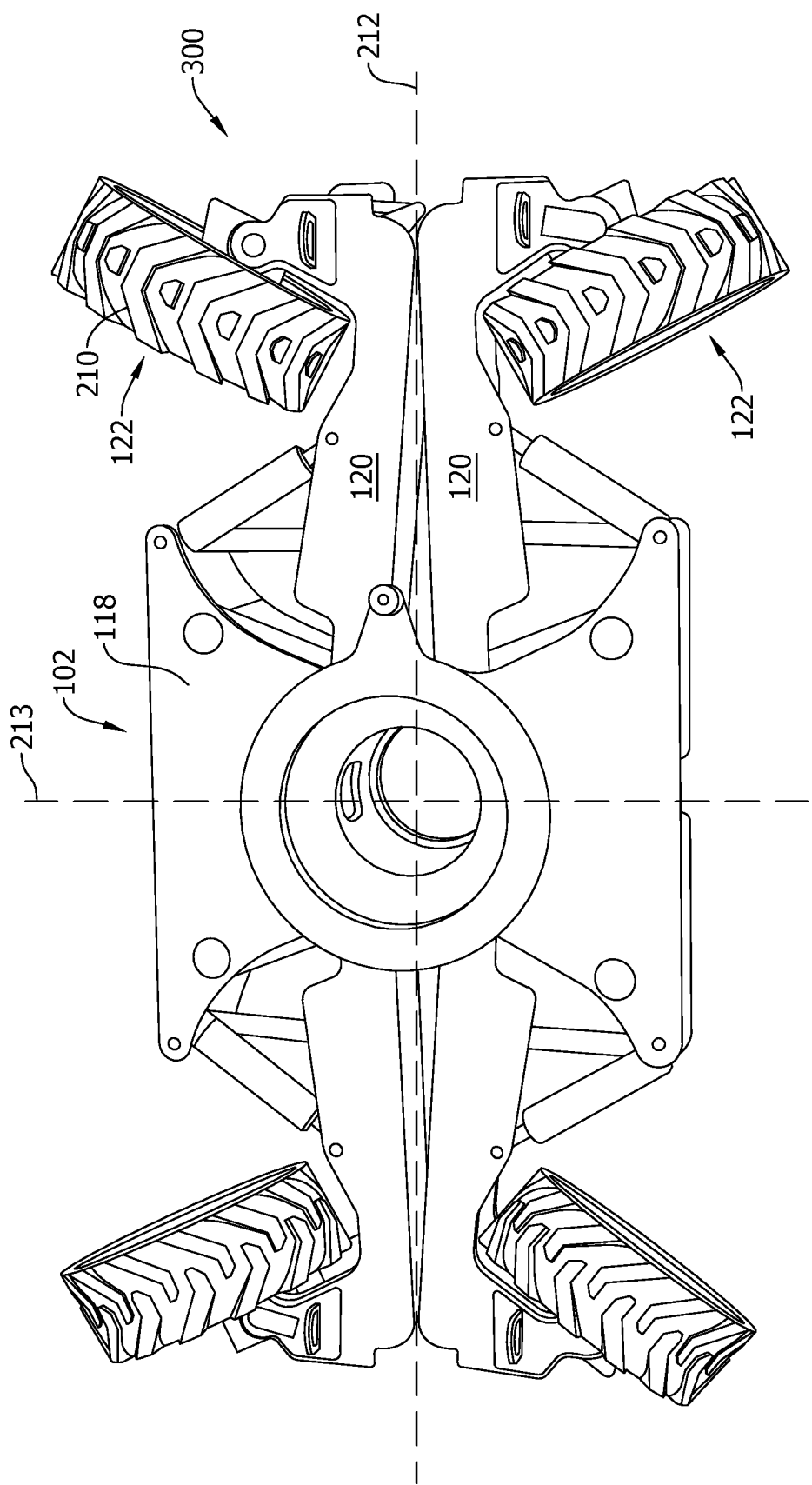
FIG. 3 is a plan view of vehicle portion shown in FIG. 1 in a steering mode.

FIG. 3 is a plan view of vehicle portion 102 in a steering mode 300. In steering mode 300, one or more of wheels wheel are independently steered to a predetermined toe-out orientation, which points wheel 126 in a direction to drive associated support arms 120 toward an extended condition while construction vehicle 100 remains stationary and without scuffing wheels 126 over travel surface 128. Steering mode 300 permits construction vehicle 100 to be configured to raise boom assembly 103 (shown in FIG. 1) to predetermined height 107 (shown in FIG. 1).

Figure 4:
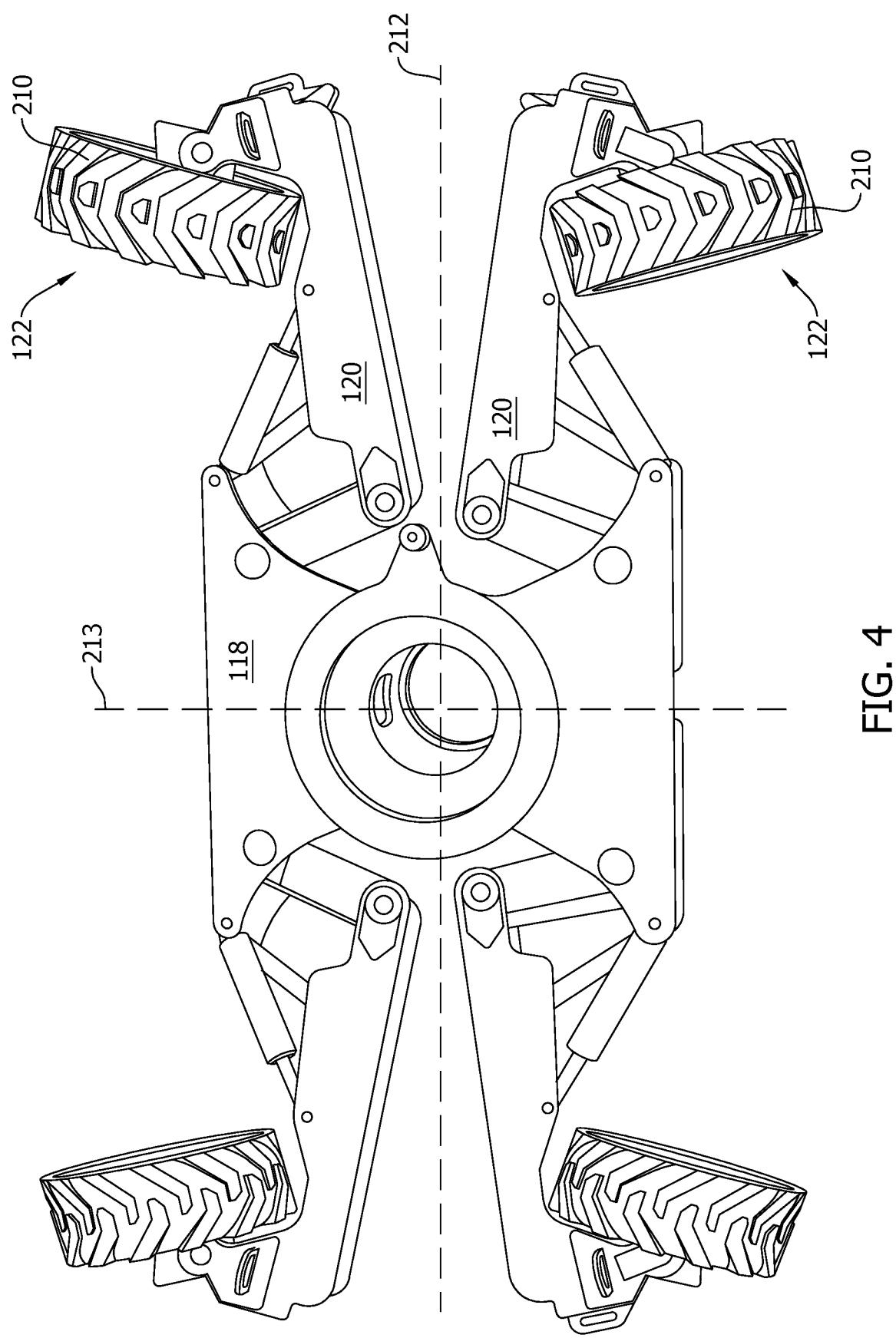
FIG. 4 is a plan view of vehicle portion shown in FIG. 1 in an intermediate mode.

FIG. 4 is a plan view of vehicle portion 102 in an intermediate mode 400. In intermediate mode 400, support arms 120 are separated as wheel assemblies 122 drive wheels 126 outward away from base 118 in both longitudinal and lateral directions thereby increasing the wheel track and wheel base of construction vehicle 100 simultaneously unaided by hydraulic cylinders or other force imparting devices. Intermediate mode 400 permits construction vehicle 100 to extend its wheel track and wheel base while remaining stationary.

Figure 5:
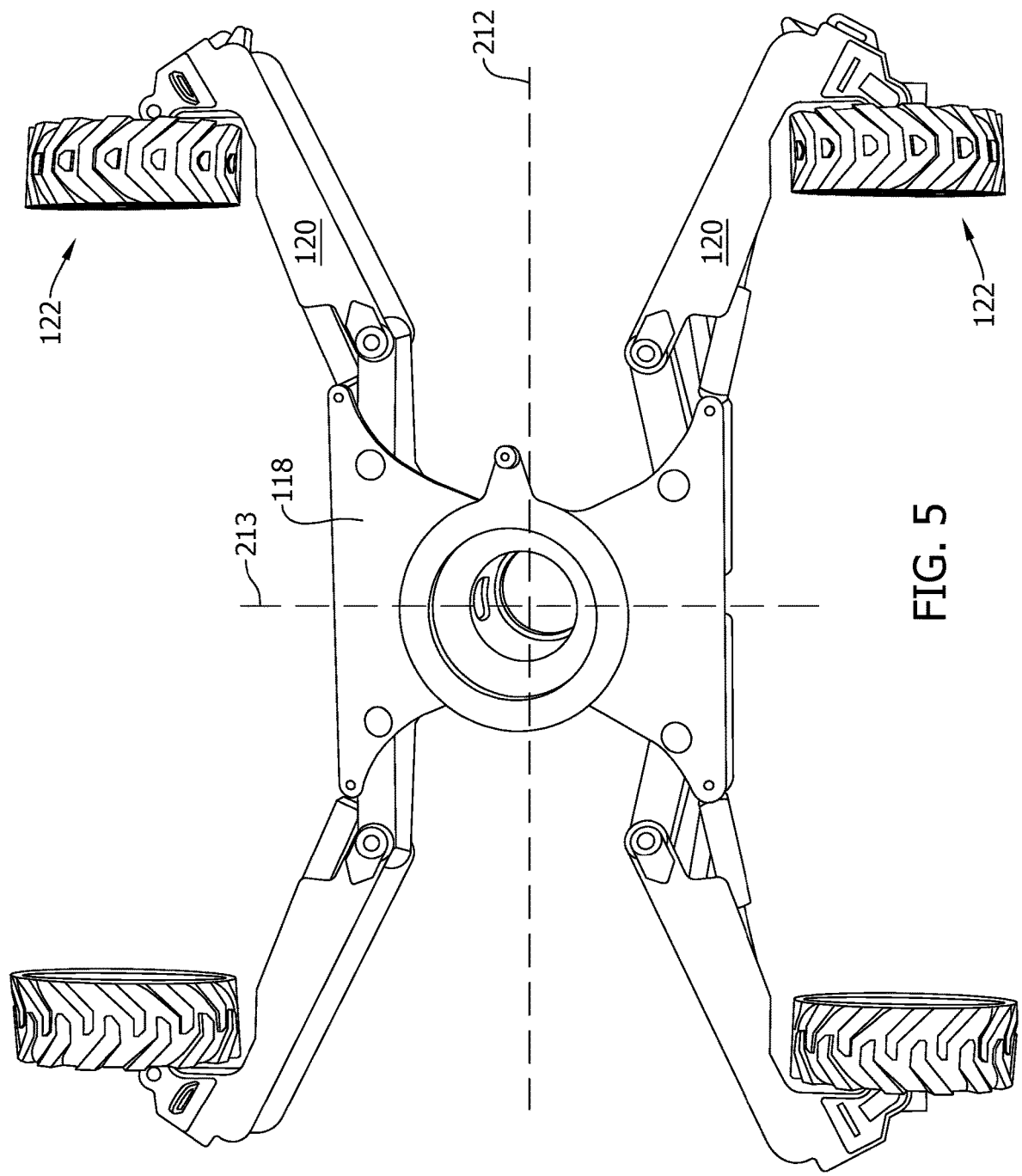
FIG. 5 is a plan view of vehicle portion shown in FIG. 1 in an extended mode.

FIG. 5 is a plan view of vehicle portion 102 in an extended mode 500. In extended mode 500, all support arms 120 are fully extended. In extended mode 500, wheel track and wheel base are both greater than wheel track and wheel base when construction vehicle 100 was in transport mode 200. In some embodiments, an increase in wheel track between transport mode 200 and extended mode 500 is 1.5 times greater than an increase in wheel base between transport mode 200 and extended mode 500. In other embodiments, an increase in wheel track between transport mode 200 and extended mode 500 is 2.5 times greater than an increase in wheel base between transport mode 200 and extended mode 500.

Figure 6:
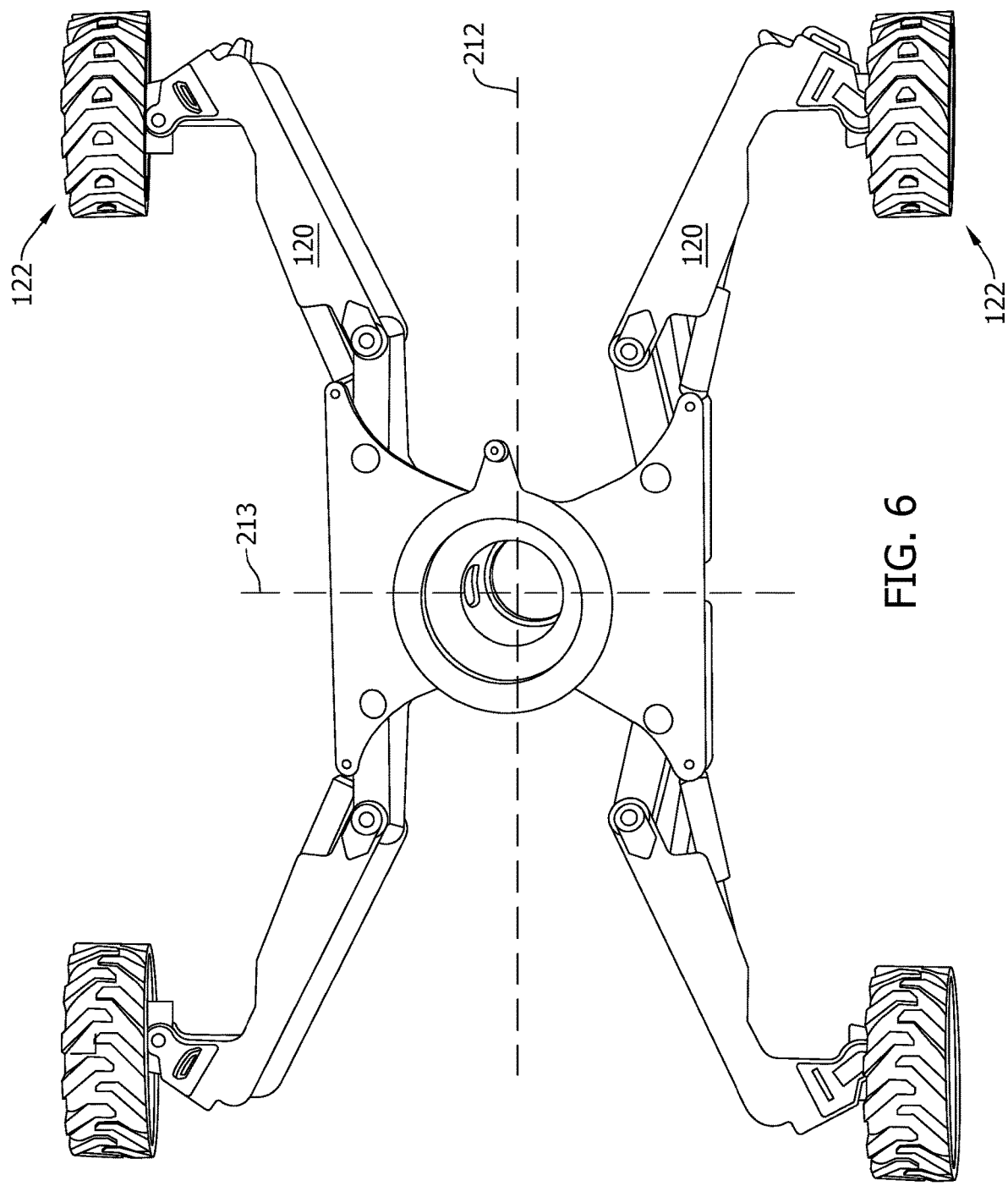
FIG. 6 is a plan view of vehicle portion shown in FIG. 1 in an operational mode.

FIG. 6 is a plan view of vehicle portion 102 in an operational mode 600. In operational mode 600, all support arms 120 are fully extended and wheels 126 are controlled by steerage commands from an operator. Operational mode 600 permits boom assembly 103 to be raised to its full height 107 given construction vehicle 100 meets all requirements for raising boom assembly 103 to its full height 107.

Figure 7:
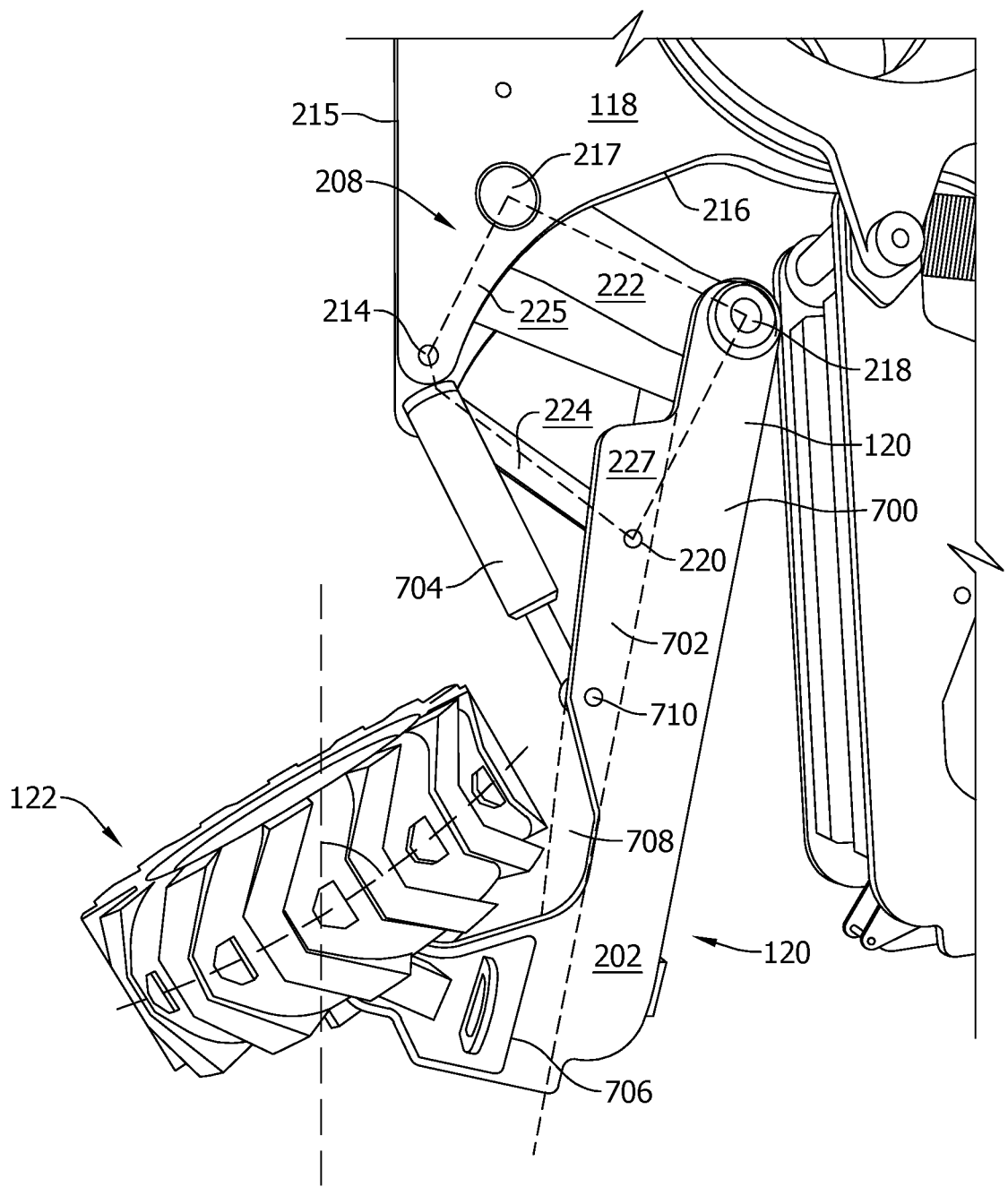
FIG. 7 is a plan view of a one of the plurality of support arms.

FIG. 7 is a plan view of a one of the plurality of support arms 120. In various embodiments, support arms 120 include for example, an I-beam body 700, a flange extension 702 configured to permit connection of secondary link 224 and a hydraulic cylinder 704 to support arm 120, a wheel extension 706 configured to permit connection of wheel assembly 122 to distal end 202, and a wheel notch 708 between flange extension 702 and wheel extension 706 configured to reduce interference of support arm 120 with wheel 126 when wheel 126 is turned.

In the example embodiment, hinge assembly 208 includes a plurality of pivotable connection points including base pivot 214 positioned at an intersection of adjacent straight sides 215 and concave sides 216, king pin 217 of base 118 spaced apart from base pivot 214, main pivot 218 positioned at base end 206, and intermediate pivot 220 positioned between base end 206 and distal end 202. Hinge assembly 208 also includes main support beam 222 pivotally coupled between king pin 217 and main pivot 218, secondary link 224 pivotally coupled between intermediate pivot 220 and base pivot 214, a portion of base 118 between king pin 217 and base pivot 214, and a portion of support arm 120 between main pivot 218 and intermediate pivot 220. Double-acting hydraulic cylinder 704 is coupled between base pivot 214 and a flange extension pivot 710. Hydraulic cylinder 704 is configured to apply a force to support arm 120 during low wheel traction conditions, such as, sand, mud, snow or any soft and slippery track, or uneven travel surface to facilitate the extension or retraction of support arm 120. Double-acting hydraulic cylinder 704 may be used to aid extension or retraction of support arm 120 of may be used as the only force applied to extend or retract support arm 120.

Figure 8:
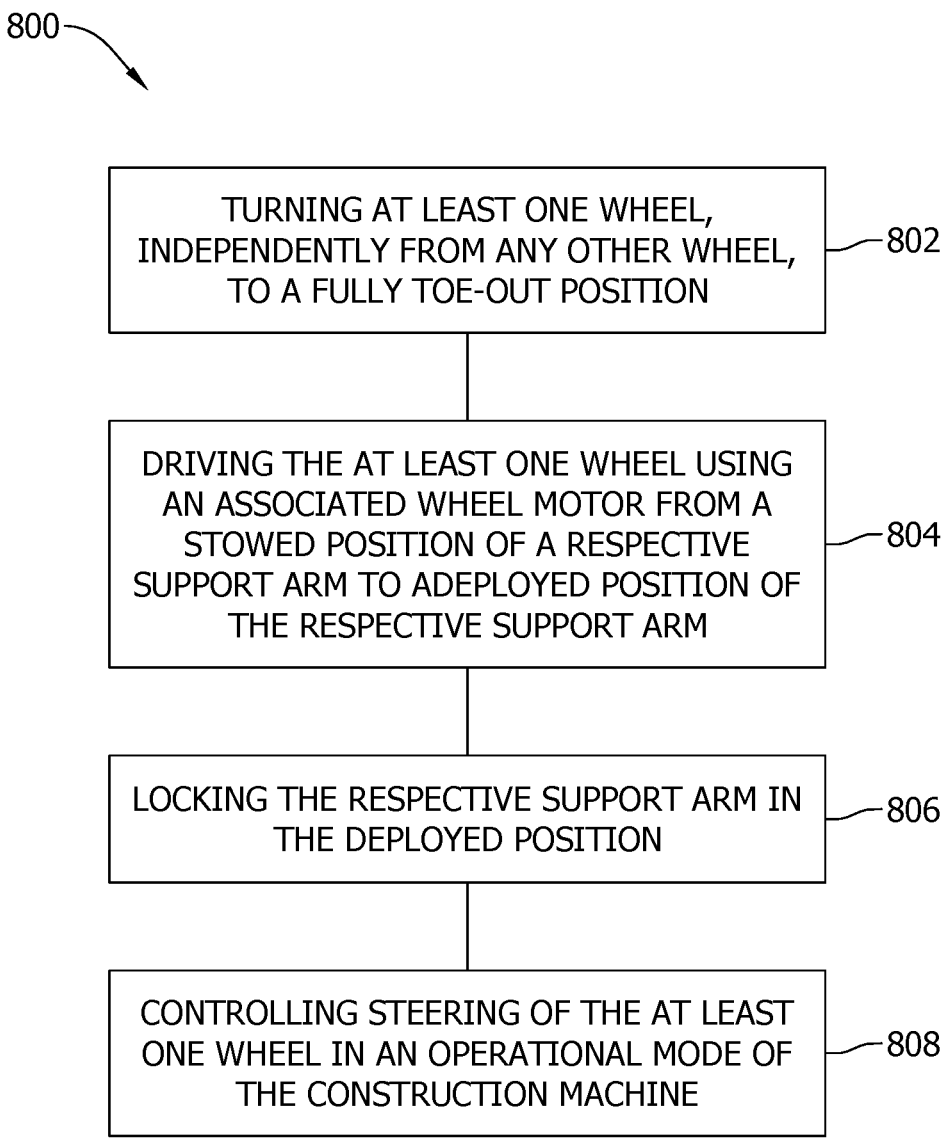
FIG. 8 is a flowchart of a method of operating the construction machine shown in FIG. 1.

FIG. 8 is a flowchart of a method 800 of operating a construction machine. Method 800 includes turning 802 at least one wheel, independently from any other wheel, to a predetermined toe-out orientation, driving 804 the at least one wheel using an associated wheel motor from a stowed condition of a respective support arm to a deployed condition of the respective support arm, locking 806 the respective support arm in the deployed condition, and controlling 808 steering of the at least one wheel in an operational mode of the construction machine.

Figure 9:
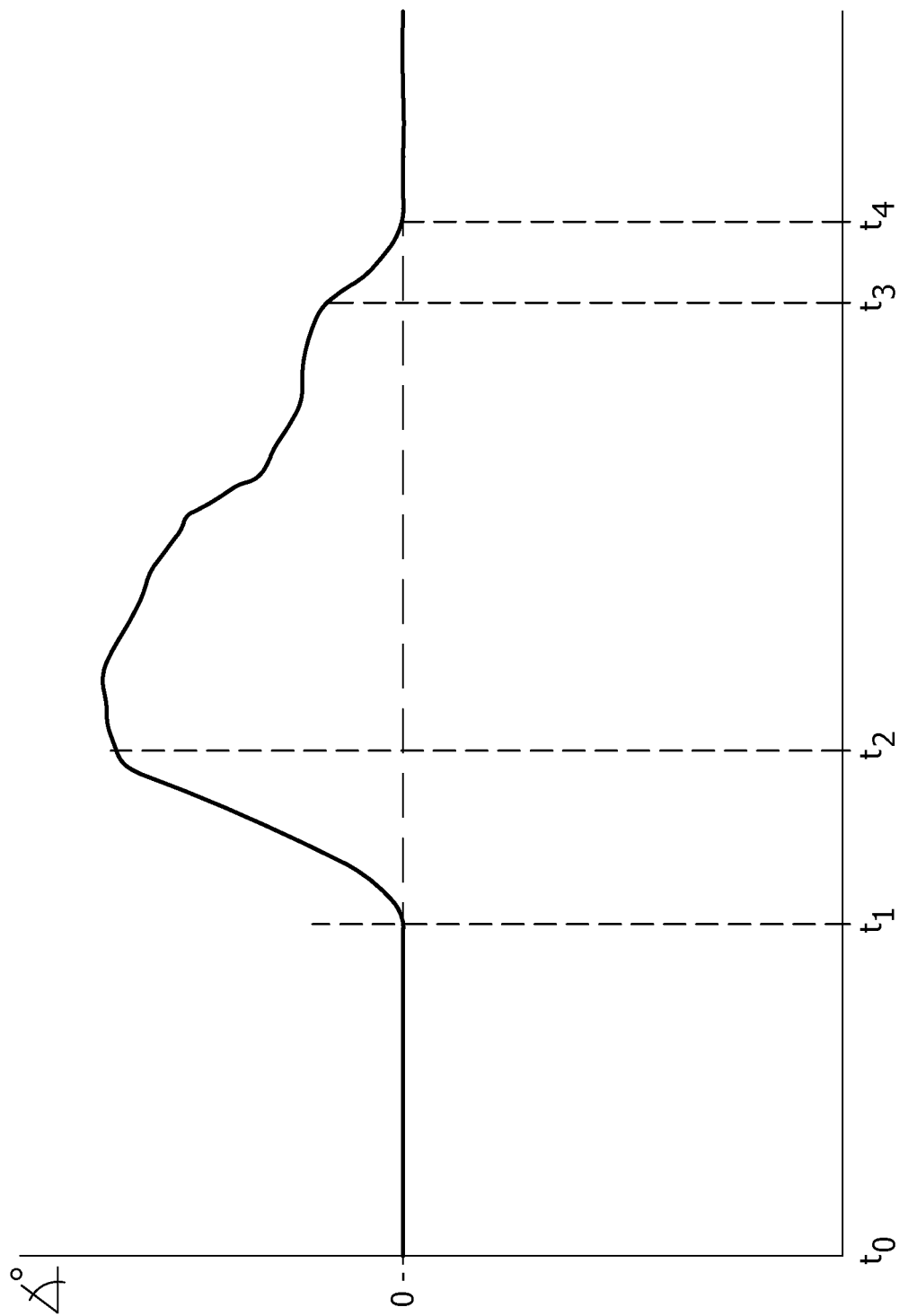
FIG. 9 is a graph of wheel angle versus support arm position during extension of the wheel base and wheel track of the construction vehicle shown in FIG. 1.

FIG. 9 is a graph 900 of wheel angle versus support arm position over time during extension of the wheel base and wheel track of construction vehicle 100 (shown in FIG. 1). In the example embodiment, a steering angle of wheels 126 is determined based on an angle of each respective support arm 120. A command is generated by controller 130 based on the determination and transmitted to a steering actuator 524 on wheel assembly 122. The steering actuator 524 is configured to rotate wheel 126 about a steering axis 674, thereby permitting wheel assembly 210 to be driven by wheel 126 to an extended position of an associated support arm 120 without scuffing wheel 126 on travel surface 128. Graph 900 includes an x-axis 902 graduated in units of time or support arm position and a y-axis 904 graduated in units of degrees angle related to the angular position of wheel 126 with respect to support arm 120 or with any other suitable reference. Graph 900 also includes a trace 906 illustrating a relationship between the wheel angle generated by wheel angular position indicator 131 and the support arm angle generated by support arm angular position indicator 230. Between $t_0$ and $t_1$, trace 906 illustrates wheel 126 as having an approximately zero angle, which is typical for the transport mode of operation. Between $t_1$ and $t_2$, trace 906 illustrates the wheel angle changing from approximately zero degrees to a predetermined toe-out angle, which is approximately a maximum toe-out angle. Between $t_2$ and $t_3$, trace 906 illustrates the wheel angle changing based on the angle of the associated support arm 120 and an angle that eliminates scuffing of wheels 126 across travel surface 128. In various embodiments, a lookup table stored in memory device 134 is used by controller 130 to generate commands for each wheel assembly 122. Between $t_3$ and $t_4$, trace 906 illustrates wheel angle 228 changing from an angle generated by controller 130 to approximately zero degrees for entry into the operational mode (shown in FIG. 6).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A support system for a vehicle comprising:
   a base comprising at least two opposing straight sides and two opposing concave sides;
   at least a first and a second support arm, each said first and said second support arm comprising a base end pivotally coupled to said base through a respective hinge assembly, each said first and said second support arm further comprising a distal end opposite said base end;
   a respective wheel assembly coupled to each said distal end, each said wheel assembly comprising:
      an independently powered and steerable wheel configured to engage a travel surface;
      a propelling motor configured to drive a respective first support arm between a stowed condition and a deployed condition unaided while said vehicle remains stationary; and
      a steer actuator configured to change an angle of said wheel with respect to a respective support arm;
   wherein said hinge assembly comprises:
      a base pivot at an intersection of said adjacent straight sides and said concave sides of said base;
      a king pin of said base spaced a distance from said base pivot;
      a main pivot at said base end; and
      a main support beam pivotally coupled between said king pin and said main pivot.

2. The vehicle support system of claim 1, wherein each wheel assembly is configured to drive one of said first support arm and said second support arm away from the other of said first support arm and said second support arm and configured to drive said distal end away from said base while stationary without scuffing.

3. The vehicle support system of claim 1, further comprising a propelling motor configured to drive one of said first support arm and said second support arm away from the other of said first support arm and said second support arm and configured to drive said distal end away from said base while stationary.

4. The vehicle support system of claim 1, further comprising a propelling motor configured to drive a respective first support arm away from said second support arm and configured to drive said distal end away from said base while said vehicle remains stationary.

5. The vehicle support system of claim 1, wherein said base comprises a double concave shape in a longitudinal direction, the double concave shape comprising the two opposing straight sides and the two opposing concave sides.

6. The vehicle support system of claim 1, wherein said hinge assembly comprises an intermediate pivot between said base end and said distal end.

7. The vehicle support system of claim 6, wherein said hinge assembly comprises:
   a secondary link pivotally coupled between said intermediate pivot and said base pivot; and
   a portion of said support arm between said main pivot and said intermediate pivot.

8. The vehicle support system of claim 7, wherein said support arms comprise:
   an I beam body;
   a flange extension configured to permit connection of said secondary link and a hydraulic cylinder to said support arm;
   a wheel extension configured to permit connection of said wheel assembly to said distal end; and
   a wheel notch between said flange extension and said wheel extension configured to reduce interference with said wheel when said wheel is turned.

9. The vehicle support system of claim 1, further comprising a double acting hydraulic cylinder coupled between said base pivot and a flange extension pivot, said hydraulic cylinder configured to apply a force to said support arm during low wheel traction conditions.

10. The vehicle support system of claim 9, wherein the low wheel traction conditions comprise sand, mud, snow or any soft and slippery track, or uneven travel surface.

11. The vehicle support system of claim 1, wherein between a stowed condition where all support arms are in the stowed condition and a deployed condition where all support arms are in the deployed condition a wheel track distance is increased a greater amount than a change in a wheel base distance, the wheel track distance being a distance measured between two wheels coupled on the same straight side of said base, the wheel base distance being a distance measured between two wheels coupled on the same concave side of said base.

12. The vehicle support system of claim 11, wherein between a stowed condition where all support arms are stowed and a deployed condition where all support arms are deployed, the wheel track distance is increased 2.25 times greater amount than a change in the wheel base distance.

13. The vehicle support system of claim 11, wherein between a stowed condition where all support arms are stowed and a deployed condition where all support arms are deployed, the wheel track distance is increased greater than two times the distance than a change in the wheel base distance.

14. An aerial work vehicle comprising:
a self propelled vehicle base;
a telescoping boom pivotally coupled to an upper surface of said vehicle base;
a plurality of support arms pivotable outwardly from said base in a same plane as said base, each of the plurality of support arms comprising:
a hinge assembly coupled to a respective corner of said base, a portion of said base forming a portion of said hinge assembly, said hinge assembly comprising a king pin spaced a distance from the corner of said base;
a first end of a support arm body coupled to said king pin via a main support beam, said main support beam pivotally coupled to said king pin and to said support arm body first end; and
a wheel assembly coupled to a second end of said support arm body.

15. The aerial work vehicle of claim 14, wherein said wheel assembly comprises:
an independently powered and independently steerable wheel configured to engage a travel surface;
a propelling motor configured to drive, unaided, an associated support arm between a stowed condition and a deployed condition while said aerial work vehicle remains stationary; and
a steer actuator configured to change an angle of said wheel with respect to said associated support arm.

16. The aerial work vehicle of claim 15, wherein said aerial work vehicle comprises a wheel base in a longitudinal direction and a wheel track in a lateral direction, the wheel base and wheel track being a distance between related wheels, between the stowed condition and the deployed condition a change in a length of the wheel track is greater than a change in the wheel base.

17. The aerial work vehicle of claim 14, wherein said hinge assembly comprises an asymmetrical parallelogram assembly.

18. The aerial work vehicle of claim 17, wherein said telescoping boom is extendable to greater than 65.0 meters in length when fully extended.

* * * * *